Figure 1:
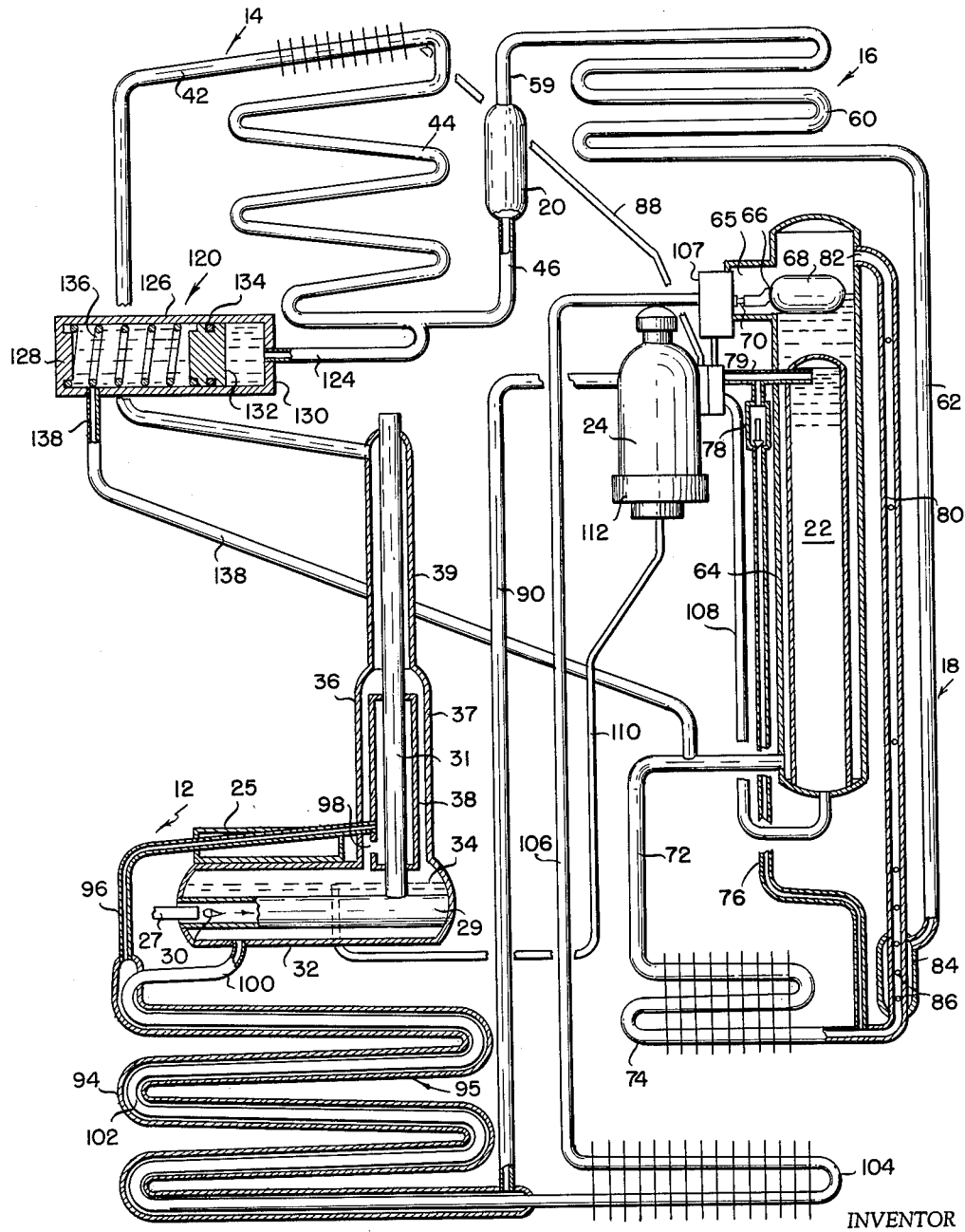

June 30, 1964 L. D. BEARDSLEE 3,138,938
ABSORPTION REFRIGERATION APPARATUS
Filed Dec. 20, 1962 2 Sheets-Sheet 1

INVENTOR
Lewis D. Beardslee

BY
ATTORNEYS

June 30, 1964 L. D. BEARDSLEE 3,138,938
ABSORPTION REFRIGERATION APPARATUS
Filed Dec. 20, 1962 2 Sheets-Sheet 2

INVENTOR
Lewis D. Beardslee
BY
ATTORNEYS

United States Patent Office 3,138,938
Patented June 30, 1964

3,138,938
ABSORPTION REFRIGERATION APPARATUS
Lewis D. Beardslee, Greenville, Mich., assignor, by mesne assignments, to Montcalm Inc., Greenville, Mich., a corporation of Michigan
Filed Dec. 20, 1962, Ser. No. 246,219
5 Claims. (Cl. 62—141)

This invention relates to absorption refrigeration apparatus and more particularly to apparatus for automatically controlling the concentration of the refrigerant in the system.

The apparatus of the invention has particular utility when applied to an absorption refrigeration device of the type which includes a generator in which a mixture of refrigerant and absorbent is boiled, a condenser connected by a vapor conduit to the generator to liquefy the refrigerant vapor delivered thereby, an evaporator or cooling unit in which the liquefied refrigerant is permitted to vaporize, the evaporator having a restricted connection to the condenser, an absorber in which the gas from the evaporator is re-absorbed in a liquid solution of absorbent and refrigerant, and transfer means for effecting flow of liquid between the generator and the absorber.

Apparatus of this type may be used to cool a food storage cabinet or for other refrigeration purposes and one form of such apparatus is described in detail in my copending application Serial No. 187,024, filed April 12, 1962.

In this copending application, I have disclosed means to control the pressure in the low pressure side of the system to prevent the evaporator temperature from becoming too low when the ambient temperature is low, while providing ample refrigeration during high ambient temperature. While thermostatic control of the heat supplied to the generator provides some control of the evaporator temperature, it cannot compensate for the great difference in the efficiency of the system caused by changes in atmospheric temperatures (which affect the heat transfer from the condenser and absorber as well as heat losses from the refrigerator cabinet) particularly when the condenser and absorber are air cooled as in a household refrigerator.

The means to control the pressure disclosed in the aforesaid copending application comprises an expansible refrigerant reservoir connected to the outlet from the condenser, for storing a part of the refrigerant, the amount varying with the condenser pressure, since the volume of the reservoir increases as the condenser pressure increases. When the condenser pressure is high, as in hot weather, refrigerant is forced into the reservoir and withdrawn from circulation, resulting in a reduction of the concentration of refrigerant in the absorber, more rapid absorption in the absorber of vapor from the evaporator, with a resultant lower pressure and temperature in the evaporator, increasing the refrigerating effect.

When the condenser pressure is low as in cool weather, the stored refrigerant returns to the refrigerant circuit, raising the concentration in the absorber, thus preventing the pressure drop therein which would otherwise be experienced and preventing a corresponding drop in the evaporator temperature which would waste refrigeration and freeze the food in the storage cabinet.

In the apparatus disclosed in the aforesaid copending application the variation in the volume of refrigerant in the reservoir is produced by balancing the condenser pressure against the pressure of a gas, such as nitrogen, in a flexible bag within the reservoir, the refrigerant being on the outside of the bag. When the refrigerant pressure exceeds the pressure in the bag, the volume of the gas therein is reduced until the increase in its pressure again balances that of the refrigerant, thus increasing the space to store refrigerant within the reservoir on the outside of the bag. When the refrigerant pressure drops, the higher pressure within the bag causes the bag to expand and to force refrigerant back into the circulating system, thus increasing the concentration in the absorber.

However, this method of controlling the evaporator temperature produces a change in the volume of liquid in the system, altering the liquid level in the generator which affects the efficiency of operation of the unit.

The structure incorporating the flexible bag is quite expensive to produce, since the bag must be charged with gas and sealed, must be impervious to the gas and not attacked by the refrigerant and must withstand high pressure.

It is the primary object of this invention to provide in an absorption refrigeration apparatus of the type described above, means to vary the concentration of the solution in the absorber without producing any material change in the level of the solution in the generator.

This object and other objects are accomplished by providing means incorporating a movable piston within a cylinder, with refrigerant liquid from the condenser on one side of the piston and refrigerant absorbent solution on the other side. An increase in condenser pressure moves the piston and withdraws refrigerant from the circulating system. The piston is so connected in the system that it returns approximately the same amount of refrigerant-absorbent solution to the circulating system to maintain the desired liquid level without appreciable change.

In one form of the invention, one side of the piston is in communication with the outlet from the condenser while the other side of the piston is in communication with the liquid in the low pressure side of the system. A spring exerts a pressure which balances the difference in pressure on the opposite sides of the piston, the spring pressure increasing as the spring is compressed so that the amount of movement of the piston is roughly proportional to the increase in pressure within the system.

Under ordinary conditions, this will require a very powerful spring. For example, if the maximum volume of the reservoir is to be 28 cubic inches (a volume which provides good control of the pressure in a household refrigerator) and if the stroke of the piston is held to 4 inches, the piston area must be 7 square inches. If the difference between the low and high side pressures in the system is to be maintained at 180 p.s.i., which might be normal where the refrigerant is ammonia, the pressure difference to be balanced by the spring pressure would be 1260 pounds. However, for refrigerants condensing at much lower pressures, the spring would be much lighter.

In another form of the invention, the cylinder has two different diameters, with pistons in each diameter connected to move together. The larger diameter end of the cylinder is in communication with the outlet end of the condenser, the smaller diameter end is in communication with the refrigerant-absorbent solution on the high-pressure side in the generator, while the space between the two pistons is in communication with the refrigerant-absorbent solution on the low-pressure side or absorber. Thus the pressure per square inch on both ends of the piston is the same, the pressure which moves the piston acting only on the difference in area of the two pistons.

Thus if the difference in area of the two pistons is 0.5 square inch, with the same pressures in the system as in the previous example, the spring would only need to exert a pressure of 90 pounds.

Thus a further object of the invention is to provide means whereby only part of the pressure exerted on the piston by the refrigerant must be balanced by spring pressure, the rest being balanced by fluid pressure existing within the system.

A still further object is to provide in a refrigeration system as set forth in the preceding, a cylinder having a large diameter and a small diameter with a piston fitting each, the pistons being connected together, the outer end of the large diameter cylinder being in communication with the outlet of the condenser, the outer end of the small diameter cylinder being in communication with the liquid solution in the generator and the space between the two pistons being in communication with the liquid solution in the absorber, with the excess pressure on the larger diameter piston being spring balanced so that an increase in condenser pressure above a desired maximum will move the pistons towards the smaller end of the cylinder to withdraw refrigerant from the condenser and deliver an equal amount of solution to the generator and absorber.

In both forms of the invention, leakage past the piston can be prevented by use of a piston ring or O-ring. Since any leakage which might occur would be within the system, a small amount of leakage is harmless. Thus the means provided by this invention does not require precision manufacturing nor use of expensive materials.

Therefore, a further object of the invention is to provide means to stabilize the evaporator temperature under various ambient temperature conditions which is simple and cheap to produce by standard manufacturing operations.

Figure 2:
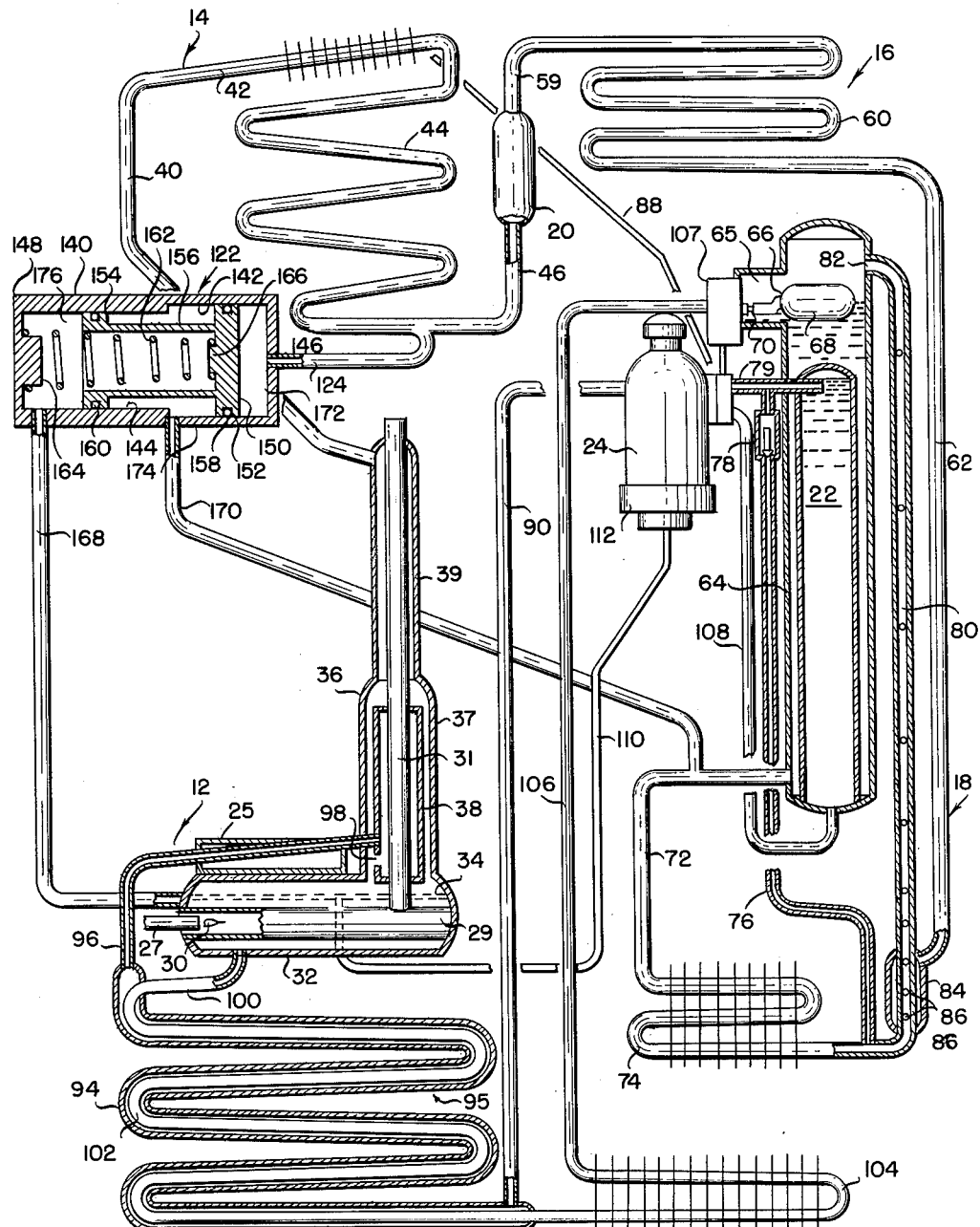

Further objects and advantages of the invention will be apparent from the following description of exemplary embodiments, in conjunction with the attached drawings, in which FIGURE 1 is a schematic diagram of an absorption refrigeration unit incorporating one form of the invention; and FIGURE 2 is a similar diagram of an absorption refrigeration unit incorporating a second form of the invention.

As shown in FIGURES 1 and 2, the basic refrigeration system comprises a generator section indicated generally at 12, a condenser section indicated generally at 14, an evaporator section indicated generally at 16 and an absorber section indicated generally at 18. The system is charged with a solution of ammonia and water having a concentration of about 29% $NH_3$ by weight, although the concentration of the charge can be varied to suit the conditions under which the system is to be used. The volume of the charge is sufficient to fill the generator and absorber to the desired levels, the charge in the embodiment shown herein weighing 12 pounds.

As explained more fully below, the charge is heated in the generator or still 12, the ammonia vapor evolved by heating is liquefied by cooling in the condenser 14, and passes through the restrictor (indicated generally at 20) and re-evaporates in the evaporator 16. The vapor is re-absorbed in the solution in the absorber 18, and means is provided to circulate weak liquor (from which ammonia has been evaporated) from the generator to the absorber and strong liquor (which has absorbed ammonia gas from the evaporator) from the absorber to the generator, including a transfer chamber 22 and a valve mechanism indicated generally at 24 which alternately connects chamber 22 to the high pressure side and to the low pressure side of the system.

The valve 24 is actuated by the difference in pressure between the solution in the generator and a solution of ammonia and water confined in a bulb 25 subjected to the heat of the generator but cooled by the returning strong liquor. The difference in the two pressures moves a piston (not shown) incorporated in valve 24 as more fully explained in the aforesaid copending application.

A burner 27 supplies heat to the generator. The rate of distillation therein is a function of the amount of heat supplied which can be controlled by means not shown, such as a manual valve or a thermostat subjected to the temperature of the space to be cooled.

Burner 27 projects into a horizontal flue 29 in generator 12, the flame 30 burning within the flue, with products of combustion leaving through a vertical flue leg 31. Body 32 of the generator is a horizontal cylinder through which flue 29 extends and is filled with the ammonia-water solution to a level 34.

Vapors boiled from the solution rise within a vertical analyzing tower 36 which projects upward from the top of generator body 32 and surrounds vertical flue leg 31. Tower 36 is enlarged in diameter at its lower portion 37 to accommodate a shell 38 surrounding flue leg 31 and is reduced in diameter at 39 above shell 38. The analyzing tower may contain baffles and/or fins (not shown) to aid in separating ammonia vapor from drops of water which drain back to the generator, the vapor leaving the upper end of tower 36 and passing upward through a tube 40 to a rectifier 42 which is an inclined finned tube in which the vapors are cooled sufficiently to re-condense water vapor but not ammonia gas. The condensate drains back to the generator.

After passing the rectifier, the refrigerant gas passes downward through condenser tube 44 which is downwardly pitched in the direction of flow and may be finned or otherwise cooled as by running water or a fan. Under the high pressure produced when the generator is heated, the vapor condenses as it is cooled in the condenser 14 so that the lower leg of the condenser is filled with liquid refrigerant which travels upward through tube 46 to a restrictor 20.

Restrictor 20 may be of any desired form, all well known in the art. One form is shown in detail in the aforementioned copending application Serial No. 187,024 to which reference may be had for details of its structure. It contains a capillary tube connected to upwardly extending tube 59 which connects to a tube coil 60 in evaporator 16. Liquefied ammonia flows through the capillary tube, the restriction and friction therein causing a pressure drop from that in the high side existing in tube 46 to the low pressure in the evaporator tube coil 60. Under this low pressure, the ammonia refrigerant evaporates, cooling evaporator coil 60.

The refrigerant vapor passes down tube 62 to the absorber 18. The absorber body includes a vertical cylindrical shell 64 surrounding the transfer chamber 22, the bottom of which is above the liquid level 34 in the generator. Shell 64 has a laterally projecting leg 65 at its upper end, and is filled with ammonia-water solution to a level 66 within this leg. A float 68 controls a valve 70 which admits more solution to the absorber when the level drops, as will be presently described.

A tube 72 connects the interior of the absorber shell 64 at a point near its lower end to a finned cooling coil 74. The outlet of coil 74 is connected to a vertical tube 76 containing a check valve 78 which permits flow upward through tube 76 into a cross tube 79, but prevents flow downward. The outlet of coil 74 is also connected to the bottom of an absorption tube 80, the upper end of which is connected to the interior of shell 64 at a point 82 just above the liquid level 66.

The lower end of absorption tube 80 is surrounded by a cylindrical shell 84, the interior of which is in communication with the interior of tube 80 through several holes 86. Tube 62 from the evaporator is connected to the upper part of shell 84 and delivers refrigerant vapor to the interior thereof. This vapor enters absorption tube 80 through holes 86. Bubbles of the vapor rise through the solution in tube 80, are absorbed therein and produce a gas lift effect causing the solution to overflow at 82 from the tube into the interior of shell 64 and setting up a circulation through tube 72, cooling coil 74 and absorption tube 80.

Since the solution is cooled as it passes through coil 74, it readily dissolves the cold vapor entering from tube 62, the solution in shell 64 gradually increasing in concentration as the solution in generator 12 decreases in concentration due to boiling away of ammonia therein. Transfer chamber 22 will also fill with solution in a manner to be presently described.

When the generator concentration has been reduced from its original value of about 29% $NH_3$ to about 15%, and its temperature has increased to about 330° F., resulting in a high side pressure of about 230 pounds per square inch, the concentration in the absorber will have risen to about 32%. At this time valve 24 will function to open communication between transfer chamber 22 and the high pressure side of the system.

A tube 88 connects the upper end of the rectifier 42 with valve 24. Another tube 90 connects valve 24 with an outer passage 94 of a heat exchanger 95, the outlet of tube 94 being connected through a tube 96 with the interior of shell 38 at an elevation below the bottom of transfer chamber 22. Tube 96 passes through and is in heat exchange relation with bulb 25. Shell 38 has a hole 98 in its side wall above the bottom thereof and below the outlet of tube 96. Another tube 100 connects the bottom of the generator body 32 with the interior passage 102 of heat exchanger 95. The outlet of passage 102 is connected to the inlet of a finned cooling coil 104, the outlet of which is connected by a tube 106 with the inlet chamber 107 of absorber 18.

The bottom of transfer chamber 22 is connected by a tube 108 with valve 24. The upper end of tube 76 (containing check valve 78) is connected to cross-tube 79 leading to the interior of the transfer chamber.

The bottom of bulb 25 is connected by a tube 110 and a nut 112 with the lower part of valve 24. The structure of valve 24 forms no part of the present invention. It is fully disclosed in the aforesaid copending application to which reference may be made.

Briefly, valve 24 is a piston valve, the valve and actuating piston being movable between a first position which they assume when the pressure in the generator transmitted through tube 90 exceeds the pressure in bulb 25 transmitted through tube 110 and a second position which they assume when the pressure in the bulb 25 exceeds the pressure in the generator.

In the first position connections between tubes 79, 88, 90 and 108 are closed. In its second position tubes 79 and 88 are in communication and tubes 90 and 108 are also in communication.

When burner 27 is first lit, the valve is in the first position or will be moved there by the rise in pressure in the generator, the pressure rise forcing solution from the generator through tube 100, coil 102, coil 104, tube 106 and valve 70 into absorber shell 64, until float 68 closes valve 70 when level 66 is attained.

Within inlet chamber 107 is a restrictor (not shown). The outlet from the restrictor connects to tube 79.

Liquid from the generator at high pressure continues to flow slowly through the restrictor to chamber 22, maintaining the interior thereof under high pressure.

Bulb 25 is charged with the same solution as was originally put into the generator. As the generator temperature rises, the temperature of bulb 25 also rises. At first the bulb temperature lags behind the generator temperature. Since the concentration in the generator drops as it is heated, while the concentration in the bulb remains substantially constant, the pressure in bulb 25 eventually will rise faster than that in the generator. Eventually the pressure actuates valve 24 to permit high pressure gas from rectifier 42 to flow through tube 88, valve 24 and tube 79 to transfer chamber 22. Since chamber 22 is above the generator, its liquid contents will flow out of the bottom by gravity through tube 108, valve 24, tube 90, outer coil 94 of the heat exchanger (where it will be warmed by the warmer fluid in the inner coil) through tube 96 (where it will be heated by hot bulb 25) into chamber 38 (where it will be further heated by hot flue leg 31), overflowing through hole 98 into generator body 32, tending to raise the level therein.

Passage of the liquid from the transfer chamber through tube 96 cools bulb 25 rapidly, causing the pressure therein to fall, thus permitting valve 24 to return to the first position.

Chamber 22 is enclosed within absorber shell 64, so that the absorber and transfer chamber attain about the same temperature. Pressure from the generator now causes a small amount of weak liquor to flow through the restrictor in chamber 107, absorbing any gas therein and lowering its pressure below that in the absorber, since the latter contains strong liquor at the same temperature. As soon as the pressure in the transfer chamber falls below that in the absorber, strong liquor will flow into and fill chamber 22 through tube 72, cooler 74 and tube 76, flowing past check valve 78. This lowers level 66, causes float 68 to drop opening valve 70, which permits weak liquor from the generator to flow through tube 100, inner tube 102 of the heat exchanger (where it is cooled by the liquid in the outer tube), through cooling coil 104, tube 106 and valve 70 into the absorber until level 66 is attained, when float 68 will close valve 70. This completes a cycle of operation which normally takes about six minutes, although the time will vary, depending on the heating rate and other conditions.

As indicated above, the distillation rate in generator 12 is a function of the pressure in the system which varies with change in ambient temperature. In hot weather, heat dissipation from the condenser and absorber is reduced, the pressure in the system rises and the concentration of the charge must be kept low enough to provide the required low evaporator temperature under the most severe conditions of climate and load. Conversely, when the ambient temperature falls and the refrigeration load is light, the pressure in the system becomes low, and in the absence of effective control the evaporator becomes too cold, food to be refrigerated may freeze and liquid refrigerant will not all evaporate in the evaporator but returns as liquid to the absorber, wasting fuel.

In accordance with the present invention the required control is provided by the unique assembly indicated generally at 120 in FIGURE 1 or the alternate assembly indicated generally at 122 in FIGURE 2. These assemblies provide means for storing a part of the refrigerant, the amount increasing as the condenser pressure increases. When the condenser pressure is high, more ammonia is withdrawn from circulation, producing a lower concentration in the absorber, more rapid absorption, a lower evaporator pressure and a lower evaporator temperature. When the condenser pressure drops, refrigerant is fed back to the system raising the concentration in the absorber and thus preventing the usual excessive drop in evaporator pressure and temperature. Thus the initial charge can contain a larger percentage of ammonia than has been customarily used in prior systems.

Referring now to the form of the invention shown in FIGURE 1, a branch tube 124 connects the bottom of condenser 14 with one end of reservoir 120. This reservoir includes a cylinder 126 and flat end walls 128 and 130 welded together. Tube 124 is welded into end wall 130 so the interior of tube 124 is in communication with the interior of cylinder 126. A piston 132, which is slidably received within cylinder 126, carries a neoprene O-ring 134 to form a seal between the piston and cylinder.

A coiled spring 136 between end wall 128 and piston 132 biases the piston toward the end wall 130. The opposite end of reservoir 120 is connected by a tube 138 with the interior of tube 72.

Liquid refrigerant under high pressure from condenser 14 fills tube 124 and the space between piston 132 and wall 130. Refrigerant-absorbent solution under low pressure from tube 72 fills tube 138 and the space between piston 132 and wall 128.

Spring 136 exerts a pressure slightly in excess of the difference between the pressure exerted by the high pressure condensed refrigerant on the one side of the piston and that exerted by the low pressure solution on the other side during operation under normal ambient temperatures, say below 80° F. Thus, at normal or low temperatures piston 132 will be biased to the right and practically none of the condensed refrigerant will be outside of the path of circulation.

During hot weather, when the ambient temperature rises, the difference in pressure between the high pressure side of the system and the low pressure side increases, moving piston 132 to the left until further compression of spring 136 again balances the pressure difference.

Refrigerant will be withdrawn from condenser 14 to fill the space between piston 132 and wall 130, and an equal volume of refrigerant-absorbent solution will be forced out of the space between piston 132 and wall 128, returning through tube 138 and tube 72 to absorber 18, temporarily raising the level 66 therein until the next return of liquid to the generator which will restore the levels to their former elevations.

Thus in hot weather when the condenser pressure is high, there will be a considerable amount of refrigerant stored out of circulation in reservoir 120, the concentration in the absorber will be low and both pressure and temperature in the evaporator will be low.

In cooler weather, when the condenser pressure is lower, the spring pressure transmitted through the piston will force refrigerant back into the refrigeration circuit and withdraw solution from the absorber raising the concentration of the solution therein and counteracting the tendency for the evaporator pressure and temperature to fall.

In a unit having a charge of refrigerant and absorbent as set forth in the foregoing, the maximum volume of the space between piston 132 and wall 130 should be approximately 28 cubic inches.

Referring now to the form of the invention shown in FIGURE 2, branch tube 124 connects the bottom of condenser 14 with one end of reservoir 122. This reservoir comprises a cylindrical body 140 which wall has two internal diameters, a large diameter bore at 142 and a small diameter bore at 144 of approximately equal length. Welded to body 140 are end walls 146 and 148. The interior of tube 124 is in communication with the interior of the larger bore 142. A piston 150 is provided with larger and smaller end portions 152 and 154, respectively, fitting loosely within bores 142 and 144. The two ends of piston 150 are connected by an integral sleeve 156 of reduced diameter. The piston portions 152 and 154 are provided with sealing O-rings 158 and 160.

A tapered spring 162 is compressed between end wall 148 and the inner face of piston portion 152. The larger end of spring 162 is centered on boss 164 and the smaller end of the spring is centered on boss 166. Such a tapered spring exerts a pressure which increases rapidly as the spring is compressed, since the large diameter coils close ahead of those of smaller diameter. Other means may be used to provide spring means which will exert an increasing pressure on the piston as the spring is compressed.

A tube 168 connects the left end of reservoir 122 with generator 12 at an elevation below liquid level 34.

Another tube 170 connects the space between piston portions 152 and 154 with tube 72 and absorber 18. The connection is made at a point which maintains communication regardless of the position of the piston 150.

The piston thus divides the space within reservoir 122 into three sections 172, 174 and 176, the volume within each of these which varies as the piston moves.

Section 172 is filled with condensed refrigerant under the high condenser pressure. Section 176 is filled with refrigerant-absorbent solution under this high generator pressure which is only slightly higher than that in the condenser, while section 174 is filled with refrigerant-absorbent solution under the lower absorber pressure.

When the refrigerator is operating under normal ambient temperature (say below 80° F.), spring 162 exerts a pressure slightly in excess of the net pressure of the fluids on the piston, holding the piston in position adjacent to end wall 146. Since the high pressure in section 172 acting on the large end of the piston is almost balanced by the high pressure in section 176 acting on the small end of the piston plus the low pressure in section 174 acting on a net area equal to the difference in area between that of the large end and that of the small end, the pressure which must be exerted by spring 162 can be very much less than that required of the spring used in the form of the invention shown in FIGURE 1.

During hot weather, when the ambient temperature is higher, the excess pressure on the end of the piston in section 172 will move the piston toward end wall 148 until the increased compression of spring 162 again causes it to exert a force balancing the fluid pressures. This will cause refrigerant to be withdrawn from condenser 14 into section 172 and will force an equal volume of refrigerant-absorbent solution to flow out of sections 176 and 174 into the generator and absorber.

Thus in hot weather when the condenser pressure is high, there will be a considerable amount of refrigerant stored out of circulation in section 172, the concentration in the absorber will be low and both pressure and temperature in the evaporator will be low.

In cooler weather when the condenser pressure is lower, the spring will force refrigerant from section 172 back into the refrigeration circuit and withdraw an equal amount of solution from the generator and absorber, raising the concentration of the solution in the absorber and counteracting the tendency for the evaporator pressure and temperature to fall.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In an absorption refrigeration system comprising a closed circuit including a generator and a condenser operating at high pressure and an evaporator and absorber operating at low pressure with a refrigerant-absorbent solution filling the generator and absorber to predetermined levels, means for controlling the amount of refrigerant circulating in said system comprising a chamber, a piston slidably mounted in said chamber, means connecting a first space in said chamber at one side of said piston to the outlet end of said condenser whereby said first space is filled with refrigerant, means connecting a second space at the opposite side of said piston to said absorber whereby said second space is filled with refrigerant-absorbent solution whereby when the pressure of said refrigerant increases, said piston is moved in a direction to increase the size of said first space and decrease the size of said second space to thereby reduce the amount of refrigerant in circulation while maintaining the amount of fluid in said system substantially constant.

2. In an absorption refrigeration system comprising a closed circuit including a generator and a condenser operating high pressure and an evaporator and absorber operating at low pressure with a refrigerant-absorbent solution filling the generator and absorber to predetermined levels, means for controlling the amount of refrigerant circulating in said system comprising a chamber, a piston slidable in said chamber, means connecting a first space in said chamber at one side of said piston to the outlet end of said condenser whereby said first space is filled with refrigerant, means connecting a second space at the opposite side of said piston to said absorber whereby said second space is filled with refrigerant-absorbent solution, and a spring biasing said piston in a direction to reduce the size of said first space whereby when the pressure at the outlet end of said condenser exceeds the sum of the pressure in said absorber plus the force exerted by said spring, said piston will move in a direction to increase the size of said first space and decrease the size of said second space to thereby reduce the amount of refrigerant in circulation while maintaining the amount of fluid in said system substantially constant.

3. In an absorption refrigeration system comprising a closed circuit including a generator and a condenser operating at high pressure and an evaporator and absorber operating at a low pressure with a refrigerant-absorbent solution filling the generator and absorber to predetermined levels, means for controlling the amount of refrigerant circulating in said system comprising means forming a cylinder, a piston slidable in said cylinder, means connecting one end of said cylinder to the outlet end of said condenser whereby the space at one side of said piston is filled with refrigerant, means connecting the opposite end of said cylinder to said absorber whereby the space at the opposite side of said piston is filled with refrigerant-absorbent solution, a spring compressed between said piston and said opposite end of said cylinder whereby when the pressure of said refrigerant at the outlet end of said condenser rises above a predetermined value, said piston is moved in a direction to compress said spring to decrease the amount of refrigerant circulating in said system while maintaining the amount of fluid in said system substantially constant.

4. In an absorption refrigeration system comprising a closed circuit including a generator and a condenser operating at high pressure and an evaporator and absorber operating at a low pressure with a refrigerant-absorbent solution filling the generator and absorber to predetermined levels, means for controlling the amount of refrigerant circulating in said system comprising means forming a cylinder having a large end and a small end, first and second connected pistons slidable in the respective small and large ends of said cylinder, means connecting the larger end of said cylinder to the outlet of said condenser, means connecting the small end of said cylinder to said generator, and means connecting the space between said pistons to said absorber whereby the position of said pistons is a function of the pressure at the outlet end of said condenser and the pressure in said evaporator and in said generator.

5. The apparatus according to claim 4 together with a spring compressed between the small end of said cylinder and a surface on said pistons effective to bias said pistons in opposition to the pressure exerted by said refrigerant in the larger end of said cylinder.

References Cited in the file of this patent
UNITED STATES PATENTS

| 1,822,224 | Knight | Sept. 8, 1931 |
| 2,178,561 | Coons | Nov. 7, 1939 |